United States Patent Office 2,816,874
Patented Dec. 17, 1957

2,816,874

RESINOUS COMPOSITION COMPRISING ACID ADDUCTS AND CERTAIN AMINOPLAST RESINS DISSOLVED IN GLYCOLS

Alfred F. Schmutzler, Stamford, Conn., assignor to American Cyanamid Company, New York, N. Y., a corporation of Maine No Drawing. Application February 1, 1954, Serial No. 407,605

16 Claims. (Cl. 260—21)

This invention relates to a composition of matter comprising the acid adduct of an alpha,beta unsaturated carboxylic acid and an unsaturated aliphatic acid having between 12 and 20 carbon atoms and the formaldehyde condensation product of dicyandiamide and/or guanylurea and/or an aminobiguanide dispersed in a solvent. Still further, this invention relates to printing inks containing the compositions of the present invention.

One of the objects of the present invention is to prepare a composition comprising the acid adduct of an alpha, beta unsaturated carboxylic acid and an unsaturated aliphatic acid having between 12 and 20 carbon atoms and the formaldehyde condensation product of dicyandiamide and/or guanylurea and/or an aminobiguanide dispersed in a solvent. A further object of the present invention is to produce printing inks and, more particularly, steam setting printing inks by utilizing the compositions of the present invention. These and other objects of the present invention will be discussed more fully hereinbelow.

In the preparation of the compositions of the present invention, one may prepare the acid adduct of an alpha, beta unsaturated carboxylic acid and an unsaturated aliphatic acid having between 12 and 20 carbon atoms and preferably between 16 and 18 carbon atoms. The acid adduct thus prepared is physically admixed with a dicyandiamide-formaldehyde condensation product or with a guanylurea-formaldehyde condensation product or with an aminobiguanide-formaldehyde condensation product or mixtures of these condensation products or a dicyandiamide-guanylurea-formaldehyde condensation product or a dicyandiamide-aminobiguanide formaldehyde condensation product or a dicyandiamide-guanylurea-aminobiguanide formaldehyde condensation product.

The alpha,beta unsaturated carboxylic acids, which are utilized in the preparation of the composition of the present invention may be either monocarboxylic or polycarboxylic.

Amongst the polycarboxylic acids that one may use are maleic acid, fumaric acid, aconitic acid, itaconic acid and the like. These acids may be used either singly or in combination with one another and whenever available the anhydrides of these acids may be used and they may be used either singly or in combination with one another or in combination with any of the acids per se. One may utilize the alpha,beta unsaturated monocarboxylic acids such as acrylic, crotonic and the like.

Amongst the unsaturated aliphatic acids which can be utilized to form the acid adduct with the alpha,beta unsaturated carboxylic acids are those straight chain aliphatic monocarboxylic acids containing between 12 and 20 carbon atoms and preferably those containing between 16 and 18 carbon atoms such as myristoleic acid, palmitoleic acid, oleic acid, linoleic acid, linolenic acid, elaeostearic acid, liconic acid, ricinoleic acid and the like. These fatty acids may be used individually or in combination with one another or they may be used in combination with minor amounts of saturated fatty acids. Still further, these fatty acids may be derived from oils containing their triglycerides such as the fatty acids derived from soya oil, dehydrated castor oil, peanut oil, olive oil, corn oil, lineed oil and the like.

The amount of the alpha,beta unsaturated polycarboxylic acid in the adduct may vary between about 15 to 36% by weight and preferably between 20 and 33% by weight.

In order that the present invention may be more completely understood, the following examples are set forth, in which all parts are parts by weight. These examples are set forth primarily for the purpose of illustration and any specific enumeration of detail contained therein should not be interpreted as a limitation on the case except as indicated in the appended claims.

Example 1

200 parts of soya bean oil fatty acids and 100 parts of fumaric acid are introduced into a suitable reaction vessel equipped with thermometer, stirrer and reflux condenser and heated for about 12 hours at 210–230° C. The acid adduct thus formed is cooled to 120° C. and then filtered. The solid filter cake, amounting to about 5 parts, consists of unreacted fumaric acid. The filtrate is the adduct of the fumaric acid and the soya oil unsaturated fatty acids. The filtrate is soluble in the glycols.

Example 2

84 parts of dicyandiamide (1 mol) and 162 parts of a 37% aqueous solution of formaldehyde (2 mols), 93 parts of ethylene glycol (1.5 mols), 5 parts of a 28% aqueous solution of ammonia, and 20 parts of cyclohexane are introduced into a suitable reaction vessel equipped with a stirrer, thermometer, and arrangements for direct reflux and azeotropic distillations. The charge is heated and stirred until gentle reflux (75–78° C.) takes place. The batch is held at that temperature for approximately one hour, which is a sufficient period of time to permit the formation of methylol dicyandiamide. Thereupon azeotropic distillation is started to form the ether derivative and continued until approximately 135 parts of water layer have been removed. The cyclohexane is then distilled off by heating to 110°–120° C. while blowing the batch with an inert gas, preferably nitrogen, until no hydrocarbon further distills off. The heating is then continued at a temperature above 100° C. until the desired viscosity has been obtained. If a very low viscous resin solution is desired, the hydrocarbon should be boiled off below 100° C. The blowing with nitrogen will remove substantially all of the cyclohexane. The progress of "bodying" of the resin solution can be measured by checking the viscosity at regular intervals with Gardner-Holdt standard viscosity tubes or by exposing the thin film of resin solution to steam or running water. At the beginning of the "bodying" procedure, the white film formed by the latter method of examination is first water dispersible and sticky, then water insoluble but still soft and tacky, finally water insoluble, solid and non-tacky. The viscosity of the resin solution diluted 2:1 with ethylene glycol at this stage is about $Z_2$ on the Gardner-Holdt scale at 25° C. The viscosity of a 40% resin solids solution in ethylene glycol is about Y–Z on the Gardner-Holdt scale at 25° C.

Example 3

18 parts of carbon black, 40 parts of the dicyandiamide-formaldehyde resin in ethylene glycol prepared according to Example 2 (80% solids content), 20 parts of ethylene glycol, and 22 parts of the filtrate produced according to Example 1 are thoroughly stirred to form a homogeneous paste. This paste was utilized as a printing ink and had good flow, good stability and set very fast when its print was exposed to steam or was covered with water. The ink film thus produced has greatly improved water resistance over a similar ink made with the dicyandiamide resin of Example 2 alone. It became infusible and any degree of heat failed to make it smear and smudge when rubbed, whereas the conventional commercially available inks smudged and smeared when heated to about 100° C. This difference makes the ink of Example 3 very useful for heat sealing purposes where the ink film is exposed to heat and rubbing under pressure during the sealing operation.

In spite of its infusible nature, the ink film remained tough and flexible.

*Example 4*

400 parts of soya bean oil fatty acids and 100 parts of fumaric acid are treated as in Example 1.

22 parts of the acid adduct thus formed, 16 parts of carbon black, 40 parts of the dicyandiamide resin prepared according to Example 2 in ethylene glycol (80% solids), 2 parts of triethyl amine and 20 parts of propylene glycol are blended thoroughly to form a homogeneous paste useful as a printing ink. The blending was accomplished by mixing the ingredients and then milling the mixture on a three roller mill. The ink thus produced had good fluidity and good storage stability. It also performed well on a multi-roller printing press. The prints harden readily when exposed to steam. After ageing for 24 hours, the cooled films had excellent adhesion and good flexibility and water resistance.

*Example 5*

200 parts of cottonseed oil pitch, a dark brown residue from the distillation of cotton seed oil fatty acids, and 100 parts of maleic anhydride are heated for 8 hours at 175–185° C. in a reaction vessel equipped as in Example 1.

The resulting product is a hard rubber-like black solid, soluble in glycols and partially soluble in hydrocarbon solvents. When its solution in ethylene glycol is mixed with 15% dicyandiamide resin prepared according to Example 2 and then cured, a glycol insoluble and hydrocarbon insoluble solid with very good water resistance results. The curing can be accomplished slowly at room temperature after the evaporation of most of the solvent. The curing proceeds very quickly at elevated temperatures.

*Example 6*

A 50% solution of the adduct prepared according to Example 5 was substituted in the ink of Example 3 for the adduct prepared according to Example 1. The results compared favorably with those of Example 3.

*Example 7*

400 parts of cottonseed oil pitch and 100 parts of maleic anhydride were treated as in Example 5. The resulting adduct was plastic with a softening point of 62° F. This adduct like the product of Example 5 imparted toughness to the dicyandiamide compositions and inks.

*Example 8*

350 parts of rosin and 100 parts of fumaric acid are heated to form the reaction product and after filtration, the product is dissolved in diethylene glycol to form a 50% solids solution.

*Example 9*

50 parts of chrome yellow pigment, 22 parts of the 50% solids solution of the rosin-fumaric acid reaction product produced according to Example 8, 5.5 parts of guanidine carbonate, 17.5 parts of the dicyandiamide-formaldehyde resin prepared according to Example 2 (80% solids) and 5 parts of diethylene glycol were made into a printing ink by mixing the components and then milling the mixture until it is homogeneous. This ink was still good after storing it for more than 1 year. The ink had good printing properties at a relative humidity of 100% and yet its print hardened readily to hard films when exposed to steam. In contrast, a commercially available steam-setting ink made with chrome yellow had hardened to a solid mass during the same time.

The ratios of the dicyandiamide resin or the guanyl-urea-formaldehyde resin or the aminobiguanide resin to the acid adduct may vary widely from 20% to 80% by weight of the aminoplast resin to about 80%–20% by weight of the adduct. Optimum results are realized by using between 40–60% of the aminoplast resin based on the total resin solids in the composition. If good hardness is the property desired, high concentrations of the aminoplast resin should be utilized, whereas lower concentrations may be used when it is desired to have good flexibility in the resulting films.

These reaction products of these fatty acids and the alpha,beta unsaturated carboxylic acids impart toughness and water resistance to the dicyandiamide resins. In the place of the cottonseed oil pitch, other distillation residues can be substituted such as talloil pitch, marine oil pitch and the like.

The formulations of the printing inks made with the compositions of the present invention may be modified by the addition of a basic nitrogen compound, particularly when the alpha,beta unsaturated carboxylic acid content is about 20% or less by weight based on the total weight of the acid adduct reaction product. Those reaction products containing 30% and more of the alpha,beta unsaturated carboxylic acid need no basic nitrogen compound, although the addition of small amounts thereof improves the solubility of these reaction products in glycols. These basic nitrogen compounds may be alkyl amines such as methylamine, dimethylamine, ethylamine, diethylamine, trimethylamine, triethylamine, propylamine, dipropylamine, tripropylamine, butylamine, amylamine, hexylamine, cyclohexylamine, ethylenediamine, diethylene triamine, triethylene tetramine, tetraethylene pentamine, ethanolamine, diethanolamine, triethanolamine, propanolamine, dipropanolamine, dimethylamino propylamine, morpholine or compounds such as guanidine carbonate, guanidine and the like. These basic nitrogen compounds may be used, particularly when there is danger of contamination of the solvent, such as the glycols, with water. This contamination may take place when an ink is distributed over the ink mechanism of a multi-roller printing press during high humidities. This causes the failure of the ink to print properly or not at all. In order to improve the solubility of the resins in the solvent and at the same time to improve the working properties and fluidity characteristics small amounts from 0.25% to 5% these basic nitrogen compounds may be added by weight based on the resin solids.

In addition to the chrome yellow used above, one may use dyes, such as rhodamine, methyl violet, Victoria blue, chrysoidine (base) malachite green, or the like, and pigments such as carbon black, lithol toners, such as lithol red, toluidine toners, phthalocyanine blue, phthalocyanine green, phosphotungstic acid toners, aluminum hydrate lakes, hansa yellow, fire red toner, molybdate orange, chrome orange, benzidine yellow, titanium oxide white, and the like. Some of the above listed pigments are what are known as high oil adsorptive pigments and are recognized as such. When these particular pigments, such as carbon black, phthalocyanine blue and the like are used, it is generally desirable to add more of the glycol to the ink paste. When low oil adsorptive pigments such as chrome yellow and chrome orange are used, it is not necessary to add any additional glycol. The ratios of pigment to vehicle in the formulation of the inks of the present invention may be varied over the conventional range.

The products produced in accordance with the process of the present invention are soluble in glycols and alcohols which can be diluted with small portions of hydrocarbons. These products remain soluble in solution for unusually long periods of time. Upon evaporation of the solvent, however, the mixture reacts to form an insoluble and infusible product.

Among the glycols which may be used as the solvent in which these resinous materials may be dispersed are ethylene glycol, diethylene glycol, propylene glycol and dipropylene glycol. Additionally, one may make use of aqueous solutions of such solvents as butanediol, pentanediol and hexanediol. In the latter instance, the water may be present in said aqueous solutions in amounts up to about 10%.

In the preparation of the dicyandiamide-formaldehyde resins used in the compositions of the present invention, one may react the formaldehyde with the dicyandiamide in mol ratios varying between about 1 and 3 mols of formaldehyde per mol of dicyandiamide. The mol ratio of the formaldehyde to guanylurea may be varied between about 1 mol and 6 mols of formaldehyde per mol of guanylurea. The mol ratios of an aminobiguanide may be varied between about 1 mol and 6 mols of formaldehyde per mole of aminobiguanide.

I claim:

1. A composition of matter comprising from about 20% to about 80% of (1) the reaction product of between about 15% and 36% of an alpha, beta ethylenically unsaturated carboxylic acid and between about 85% and 64% of a material selected from the group consisting of (a) an ethylenically unsaturated fatty oil acid having between 12 and 20 carbon atoms and (b) the residual pitch resulting from the distillation of an ethylenically unsaturated fatty oil acid having been 12 and 20 carbon atoms and correspondingly from about 80% to about 20% of (2) a formaldehyde condensation product of a compound selected from the group consisting of dicyandiamide, aminobiguanide and guanylurea, dispersed in a solvent selected from the group consisting of ethylene glycol, diethylene glycol, propylene glycol and dipropylene glycol.

2. A composition of matter comprising from about 20% to about 80% of (1) the reaction product of between about 15% and 36% of an alpha, beta ethylenically unsaturated carboxylic acid and between about 85% and 64% of an ethylenically unsaturated fatty oil acid having between 12 and 20 carbon atoms and correspondingly from about 80% to about 20% of (2) a formaldehyde condensation product of a compound selected from the group consisting of dicyandiamide, aminobiguanide and guanylurea, dispersed in a solvent selected from the group consisting of ethylene glycol, diethylene glycol, propylene glycol and dipropylene glycol.

3. A composition of matter comprising from about 20% to about 80% of (1) the reaction product of between about 15% and 36% of an alpha, beta ethylenically unsaturated carboxylic acid and between about 85% and 64% of an ethylenically unsaturated fatty oil acid having between 16 and 18 carbon atoms and corresponding from about 80% to about 20% of (2) a formaldehyde condensation product of a compound selected from the group consisting of dicyandiamide, aminobiguanide and guanylurea dispersed in a solvent selected from the group consisting of ethylene glycol, diethylene glycol, propylene glycol and dipropylene glycol.

4. A composition of matter comprising from about 20% to about 80% of (1) the reaction product of between about 15% and 36% of fumaric acid and between about 85% and 64% of an ethylenically unsaturated fatty oil acid having between 12 and 20 carbon atoms and correspondingly from about 80% to about 20% of (2) a formaldehyde condensation product of a compound selected from the group consisting of dicyandiamide, aminobiguanide and guanylurea, dispersed in a solvent selected from the group consisting of ethylene glycol, diethylene glycol, propylene glycol and dipropylene glycol.

5. A composition of matter comprising from about 20% to about 80% of (1) the reaction product of between about 15% and 36% of fumaric acid and between about 85% and 64% of an ethylenically unsaturated fatty oil acid having between 16 and 18 carbon atoms and correspondingly from about 80% to about 20% of (2) a formaldehyde condensation product of a compound selected from the group consisting of dicyandiamide, aminobiguanide and guanylurea, dispersed in a solvent selected from the group consisting of ethylene glycol, diethylene glycol, propylene glycol and dipropylene glycol.

6. A composition of matter comprising from about 20% to about 80% of (1) the reaction product of between about 15% and 36% of fumaric acid and between about 85% and 64% of an ethylenically unsaturated fatty oil acid having between 16 and 18 carbon atoms and correspondingly from about 80% to about 20% of (2) a dicyandiamide-formaldehyde condensation product dispersed in a solvent selected from the group consisting of ethylene glycol, diethylene glycol, propylene glycol and dipropylene glycol.

7. A composition of matter comprising from about 20% to about 80% of (1) the reaction product of between about 15% and 36% of fumaric acid and between about 85% and 64% of an ethylenically unsaturated fatty oil acid having between 16 and 18 carbon atoms and correspondingly from about 80% to about 20% of (2) a guanylurea-formaldehyde condensation product dispersed in a solvent selected from the group consisting of ethylene glycol, diethylene glycol, propylene glycol and dipropylene glycol.

8. A composition of matter comprising from about 20% to about 80% of (1) the reaction product of between about 15% and 36% of an alpha, beta ethylenically unsaturated carboxylic acid and between about 85% and 64% of an ethylenically unsaturated fatty oil acid having between 12 and 20 carbon atoms and correspondingly from about 80% to about 20% of (2) a formaldehyde condensation product of a compound selected from the group conisting of dicyandiamide, aminobiguanide and guanylurea dispersed in ethylene glycol.

9. A composition of matter comprising from about 20% to about 80% of (1) the reaction product of between about 15% and 36% of an alpha, beta ethylenically unsaturated carboxylic acid and between about 85% and 64% of an ethylenically unsaturated oil acid having between 12 and 20 carbon atoms and correspondingly from about 80% to about 20% of (2) a formaldehyde condensation product of a compound selected from the group consisting of dicyandiamide, aminobiguanide and guanylurea dispersed in propylene glycol.

10. A composition of matter comprising from about 20% to about 80% of (1) the reaction product of between about 15% and 36% of an alpha, beta ethylenically unsaturated carboxylic acid and between about 85% and 64% of an ethylenically unsaturated fatty oil acid having between 12 and 20 carbon atoms and correspondingly from about 80% to about 20% of (2) a formaldehyde condensation product of a compound selected from the group consisting of dicyandiamide, aminobiguanide and guanylurea dispersed in diethylene glycol.

11. A composition of matter comprising from about 20% to about 80% of (1) the reaction product of between about 15% and 36% of an alpha, beta ethylenically unsaturated carboxylic acid and between about 85% and 64% of an ethylenically unsaturated fatty oil acid having between 12 and 20 carbon atoms and correspondingly from about 80% to about 20% of (2) a formaldehyde condensation product of a compound selected from the group consisting of dicyandiamide, aminobiguanide and guanylurea dispersed in dipropylene glycol.

12. A composition of matter comprising from about 20% to about 80% of (1) the reaction product of between about 15% and 36% of fumaric acid and between about 85% and 64% of an ethylenically unsaturated fatty oil acid having between 16 and 18 carbon atoms and correspondingly from about 80% to about 20% of (2) a dicyandiamide-formaldehyde condensation product dispersed in ethylene glycol.

13. A composition of matter comprising from about 20% to about 80% of (1) the reaction product of between about 15% and 36% of fumaric acid and between about 85% and 64% of an ethylenically unsaturated fatty oil acid having between 16 and 18 carbon atoms and correspondingly from about 80% to about 20% of (2) a dicyandiamide-formaldehyde condensation product dispersed in propylene glycol.

14. A composition of matter comprising from about 20% to about 80% of (1) the reaction product of between about 15% and 36% of fumaric acid and between about 85% and 64% of an ethylenically unsaturated fatty oil acid having between 16 and 18 carbon atoms and correspondingly from about 80% to about 20% of (2) a dicyandiamide-formaldehyde condensation product dispersed in diethylene glycol.

15. A composition of matter comprising from about 20% to about 80% of (1) the reaction product of between about 15% and 36% of fumaric acid and between about 85% and 64% of an ethylenically unsaturated fatty oil acid having between 16 and 18 carbon atoms and correspondingly from about 80% to about 20% of (2) a guanylurea-formaldehyde condensation product dispersed in ethylene glycol.

16. A composition of matter comprising from about 20% to about 80% of (1) the reaction product of between about 15% and 36% of fumaric acid and between about 85% and 64% of an ethylenically unsaturated fatty oil acid having between 16 and 18 carbon atoms and correspondingly from about 80% to about 20% of (2) a guanylurea-formaldehyde condensation product dispersed in diethylene glycol.

References Cited in the file of this patent

UNITED STATES PATENTS

| | | |
|---|---|---|
| 2,352,659 | Sell et al. | July 4, 1944 |
| 2,600,593 | Weber | June 17, 1952 |
| 2,640,814 | Schmutzler | June 2, 1953 |